Patented Sept. 11, 1945

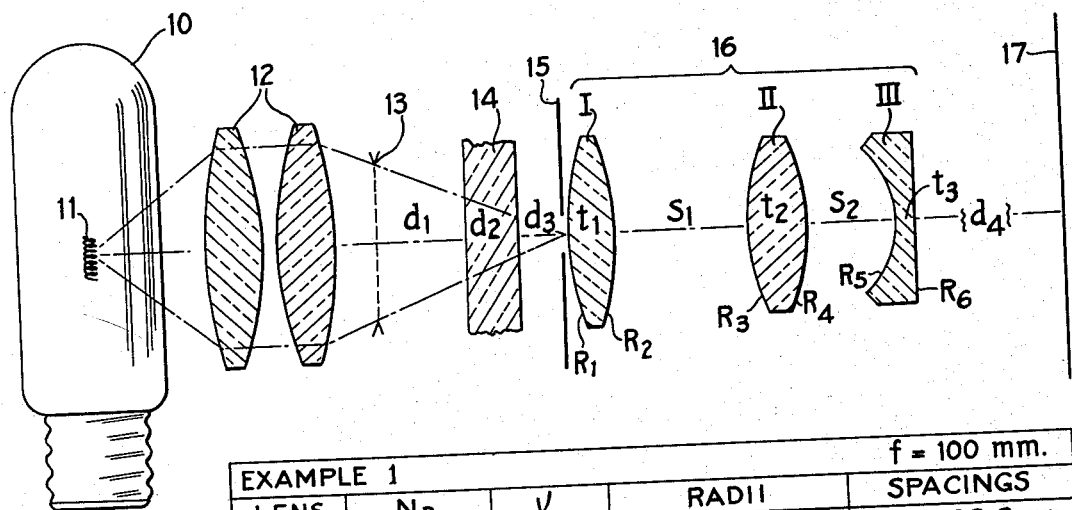
| EXAMPLE 1 | | | | f = 100 mm. |
|---|---|---|---|---|
| LENS | $N_D$ | $V$ | RADII | SPACINGS |
| PLATE | 1.523 | 58.4 | | $d_1$ = 62.2 mm. |
| | | | | $d_2$ = 37.9 |
| | | | | $d_3$ = 33.3 |
| I | 1.523 | 58.4 | $R_1$ = +186.8 mm | $t_1$ = 29.6 |
| | | | $R_2$ = −186.8 | $S_1$ = 93.8 |
| II | 1.523 | 58.4 | $R_3$ = +139.0 | $t_2$ = 39.3 |
| | | | $R_4$ = −139.0 | $S_2$ = 60.7 |
| III | 1.523 | 58.4 | $R_5$ = −62.6 | $t_3$ = 13.1 |
| | | | $R_6$ = ∞ | $d_4$ = 1386.0 |
| EXAMPLE 2 | | | | f = 100 mm. |
|---|---|---|---|---|
| LENS | $N_D$ | $V$ | RADII | SPACINGS |
| PLATE | 1.523 | 58.4 | | $d_1$ = 68.7 mm. |
| | | | | $d_2$ = 44.8 |
| | | | | $d_3$ = 33.0 |
| I | 1.523 | 58.4 | $R_1$ = +181.0 mm. | $t_1$ = 29.7 |
| | | | $R_2$ = −181.0 | $S_1$ = 94.3 |
| II | 1.523 | 58.4 | $R_3$ = +140.0 | $t_2$ = 39.6 |
| | | | $R_4$ = −140.0 | $S_2$ = 61.5 |
| III | 1.523 | 54.4 | $R_5$ = −62.8 | $t_3$ = 13.2 |
| | | | $R_6$ = ∞ | $d_4$ = 567.0 |
RUDOLF KINGSLAKE
MAX REISS
*INVENTORS*

2,384,624

UNITED STATES PATENT OFFICE 2,384,624

PROJECTION SYSTEM

Rudolf Kingslake and Max Reiss, Rochester, N. Y., assignors to Eastman Kodak Company, Rochester, N. Y., a corporation of New Jersey Application May 23, 1942, Serial No. 444,172

4 Claims. (Cl. 88—24)

This invention relates to projection systems, particularly to those used in projecting motion pictures.

It is the object of the invention to provide an inexpensive but satisfactory projection lens. It is also an object of the invention to provide a rear projection system incorporating such a lens and useful in a motion picture film viewer.

It has been thought in the past that simple projection systems were not satisfactory for wide angle projection because of distortion, curvature of field, spherical aberration, coma, etc. However, we have found one simple arrangement which is not only satisfactory but gives better definition than previous film viewer systems. According to the invention, we provide a wide angle lens consisting of three components, at least two of which and preferably all of which are simple elements separated by air, two of the components being positive and the other negative. The two positive components are separated by an air space of more than half the focal length of the lens and the negative component is in front of, i. e. on the long conjugate side of the two positive components.

In the preferred embodiment of the invention, the negative element has its more strongly curved surface facing the positive elements and is spaced from the nearer one of the positive elements by a distance between .1F and F where F is the focal length of the lens.

The most preferred embodiment of the invention has all three components as simple elements and has the spacing between the two positive components approximately equal to F and the spacing between the middle component and the front negative component about two-thirds F. For simplicity of manufacture, each of the positive elements may be equiconvex. A projection system incorporating this projection lens preferably has a condenser lens forming an image of a light source through the film to be projected and substantially in the wide angle lens. Such a system provides a long working distance between the film gate and the projection lens and is highly efficient so as to give a bright picture even though the lens is itself quite simple. The working distance between the film and the projection lens may include a glass plate used for optical compensation of the movement of motion picture film, in the well known manner of optical compensators. In the accompanying drawing is shown:

An optical system for motion picture film viewer according to the invention.

In the drawing a light source 10 having a filament 11 sends light through a condenser 12 and through a film gate 13 to form an image of the filament in the entrance pupil of a projection lens 16. This lens 16 provided with a fixed diaphragm 15 projects an image of the film in the film gate 13 onto a screen 17, the film gate and the screen being conjugate with respect to the lens 16. Between the film gate 13 and the lens 16, there is shown a plate 14 partly broken away. This plate is rotated to compensate for motion of the film through the film gate 13 in the well known way. Since the present invention relates to the optical system, the details of the operation of the optical compensator are not shown. The present invention may be used with any optical compensating device, allowance being made for the thickness of glass in the same way that allowance is made for thickness of the plate 14 in the drawing.

The projection lens 16 may have specifications according to either of the tables given below which correspond to those shown on the drawing.

Example 1

[$f=100$ mm.]

| Lens | $N_D$ | V | Radii | Spacings |
|---|---|---|---|---|
| Plate | 1.523 | 58.4 |  | $d_1=$ 62.2 mm. $d_2=$ 37.9 $d_3=$ 33.3 |
| I | 1.523 | 58.4 | $R_1=+186.8$ mm. $R_2=-186.8$ | $t_1=$ 29.6 $S_1=$ 93.8 |
| II | 1.523 | 58.4 | $R_3=+139.0$ $R_4=-139.0$ | $t_2=$ 39.3 $S_2=$ 60.7 |
| III | 1.523 | 58.4 | $R_5=-$ 62.6 $R_6=\infty$ | $t_3=$ 13.1 $d_4=1386.0$ |

Example 2

[$f=100$ mm.]

| Lens | $N_D$ | V | Radii | Spacings |
|---|---|---|---|---|
| Plate | 1.523 | 58.4 |  | $d_1=$ 68.7 mm. $d_2=$ 44.8 $d_3=$ 33.0 |
| I | 1.523 | 58.4 | $R_1=+181.0$ mm. $R_2=-181.0$ | $t_1=$ 29.7 $S_1=$ 94.3 |
| II | 1.523 | 58.4 | $R_3=+140.0$ $R_4=-140.0$ | $t_2=$ 39.6 $S_2=$ 61.5 |
| III | 1.523 | 58.4 | $R_5=-$ 62.8 $R_6=\infty$ | $t_3=$ 13.2 $d_4=567.0$ |

In the above tables it will be noted that positive elements I and II are both equiconvex and that negative element III is concave plano with the planosurface facing the front. The spacing $S_1$ is greater than one-half the focal length of the lens and is about equal to the focal length.

The spacing $S_2$ is between .1F and F and is approximately ⅔F.

Having thus described two preferred forms of our invention, we wish to point out that it is limited only as defined in the following claims.

What we claim and desire to secure by Letters Patent of the United States is:

1. A wide angle lens consisting of three air spaced components each with an axial thickness less than its diameter at least two of which are simple elements, the center component being biconvex positive, the component on the short conjugate side being positive and separated from the center component by more than .5F where F is the focal length of the lens and the one on long conjugate side being negative and separated from the center component by a distance between .1F and F, and less than the separation of the positive components, the effective pupil of the lens being between the center component and the short conjugate focus.

2. A wide angle lense consisting of three simple air spaced elements each with an axial thickness less than its diameter of which the center one and the one on the short conjugate side are biconvex and separated by about F where F is the focal length of the lens and the one on the long conjugate side is plano concave with its planosurface facing out and is spaced from the center one about ⅔ F.

3. A lens according to claim 2 in which each of the biconvex elements is equiconvex.

4. A rear projection system comprising a light source, a screen, a gate defining means between the source and the screen for holding the transparency whose image is to be projected, a wide angle lens according to claim 1 conjugately between the gate defining means and the screen, the latter being at the long conjugate focus and a condenser lens in front of the source for sending light from the source through the gate defining means and for focusing the source approximately in said wide angle lens.

RUDOLF KINGSLAKE.
MAX REISS.